Figure 1:
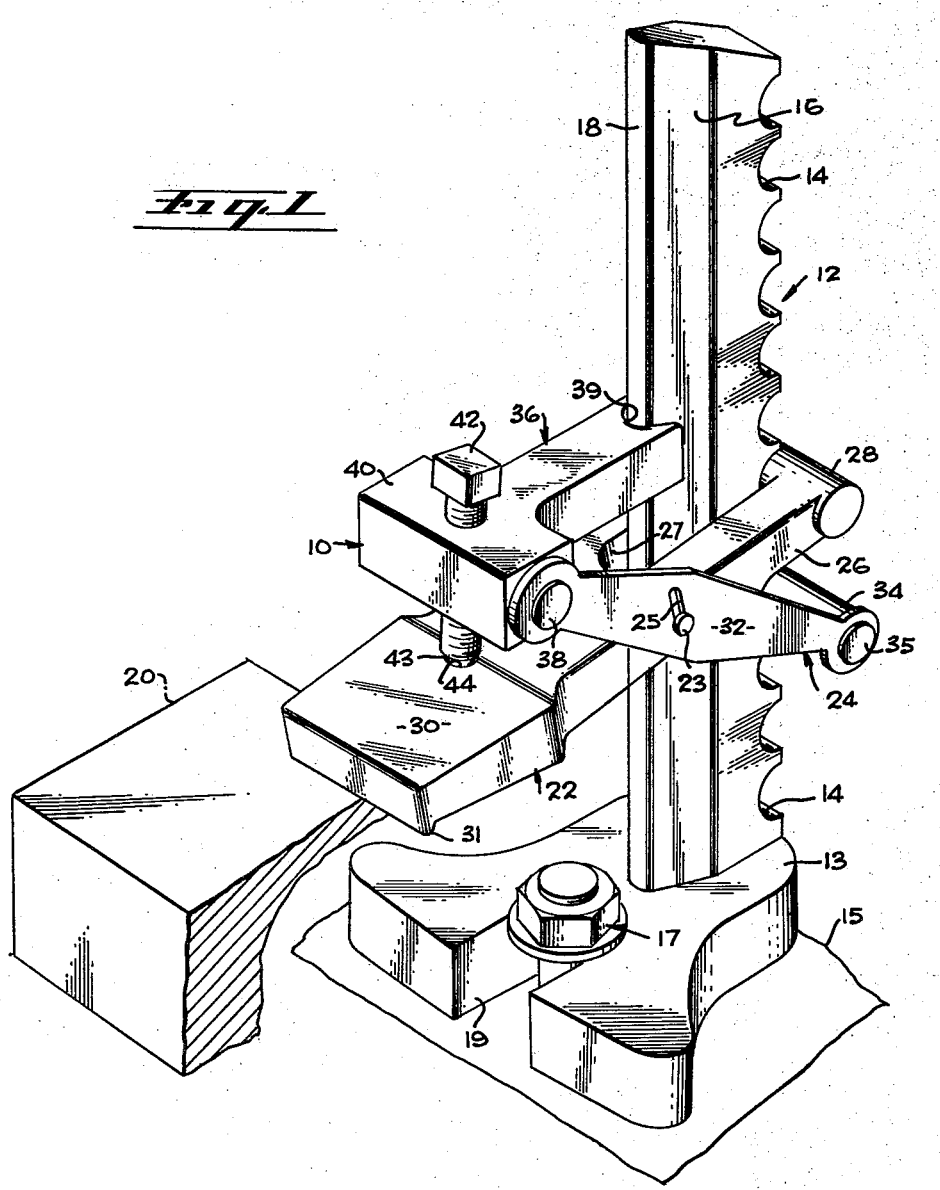

Oct. 22, 1963  L. C. WIEMKEN  3,107,910
CLAMP

Filed Feb. 13, 1962  2 Sheets-Sheet 1

INVENTOR.
LUDWIG C. WIEMKEN
BY Philip Sutter
Max Golden
ATTORNEYS

Oct. 22, 1963 L. C. WIEMKEN 3,107,910
CLAMP
Filed Feb. 13, 1962 2 Sheets-Sheet 2

INVENTOR.
LUDWIG C. WIEMKEN
BY Philip Suther
Max Geeden
ATTORNEYS

United States Patent Office 3,107,910
Patented Oct. 22, 1963

3,107,910
CLAMP
Ludwig C. Wiemken, Los Angeles, Calif., assignor to Basic Industries, Inc., Gardena, Calif., a corporation of California
Filed Feb. 13, 1962, Ser. No. 172,921
5 Claims. (Cl. 269—211)

This invention relates to a novel clamping device, and is particularly concerned with a clamp comprising a system of articulated members, and especially designed for engaging and maintaining a work piece in a preselected fixed position.

In various machine operations in the fabrication of structural parts, e.g. metal parts, such as milling and the like, it is of importance that the part or work piece being operated upon be maintained in a fixed position to insure accuracy of the particular machine operation being carried out. Where work pieces of different shapes or sizes are being operated upon, for example, on a milling machine, a variety of clamps are usually required for cooperation with such different parts.

It is an object of the invention to design a clamp suitable for engaging work pieces of various sizes and shapes to maintain same in fixed position during a machining or fabrication operation on such work pieces.

Another object is to provide a novel versatile clamping mechanism having a plurality of articulating arms and which is operative in various positions of such articulating arms for quickly and easily clamping work pieces of different sizes and shapes, in a fixed position.

Still another object is the provision of a clamping mechanism to engage and clamp a work piece in fixed position for a machining operation thereon, such mechanism comprising an articulating series of members which can be manipulated readily for engagement of said work piece by one of said members, and the articulating mechanism then adjusted with respect to a supporting clamp member, to provide a positive clamping force against the work piece.

Yet another object is the provision of a clamp having the above features, which is rugged, dependable, and can be manipulated readily.

Other objects and advantages of the invention will appear from the following detailed description of the invention.

The clamp device of the invention comprises a base which carries a vertically extending support member in the form of a ratchet having a series of semicircular grooves along its rear edge. An articulating mechanism comprising a series of interconnected pivotally mounted levers or arms, is adapted to fit over and to be moved linearly along the vertical ratchet member. According to one embodiment, two of said levers are pivotally connected intermediate their ends, each of such levers carrying at their adjacent ends a transversely positioned cylindrical pin. Said pins are adapted to mate with and engage the semicircular grooves of the ratchet support member. One of such levers is inclined downward toward its forward end and carries a clamp member at its forward end to engage a work piece to be held in fixed position, and the other of said levers is inclined upward toward its forward end and pivotally carries at such forward end a rearwardly extending arm or abutment member which is adapted to engage the front vertical edge of the ratchet member. Carried on the forward end of the abutment member is a depending screw mounted for adjustment in the abutment member, the lower end of the screw being adapted to engage the clamp member on the first mentioned lever to force the clamp member downward into engagement with the upper surface of a work piece. The pivotal connection between the two levers above mentioned, includes a free motion connection between said levers, e.g. as provided by a pin and slot connection, to permit a degree of freedom of one of said levers with respect to the other in an essentially vertical direction and also slightly laterally.

In setting the clamp against a work piece the two pivotally mounted levers are manipulated to bring the depending clamp member at the lower end of one of said levers closely adjacent to or in physical contact with the work piece. The cylindrical pin carried at the opposite end of said lever is then forced into engagement with a semicircular groove along the rear edge of the ratchet member while the cylindrical pin at the adjacent end of the other lever is forced into contact with another groove of said ratchet member below the first mentioned groove. The abutment member is then pivotally manipulated until the inner end thereof makes contact with the forward vertical edge of the ratchet member, and the screw mounted on the abutment member is turned down against the clamp member, forcing it into tight engagement with the work piece. The screw is turned down until the lateral forward components of force exerted in tension against the two levers and which is resisted by the opposite lateral component of force in compression against the abutment member, causes tight engagement of both of the above noted pins in their respective grooves in the ratchet member, and tight engagement of the inner end of said abutment member with the front edge of the ratchet member. At this time, the clamp member is in positive fixed holding engagement against the work piece. In manipulating the two levers and the abutment member to attain the above noted three point contact of the articulating system against the ratchet member, with the clamp member in contact with the work piece, the free motion connection at the point of pivotal attachment of the two levers permits sufficient free motion of such levers with respect to each other, to permit simultaneous mating of both pins at the ends of said levers, with a pair of vertically spaced grooves on said ratchet member, regardless of the vertical height of the work piece.

Figure 2:
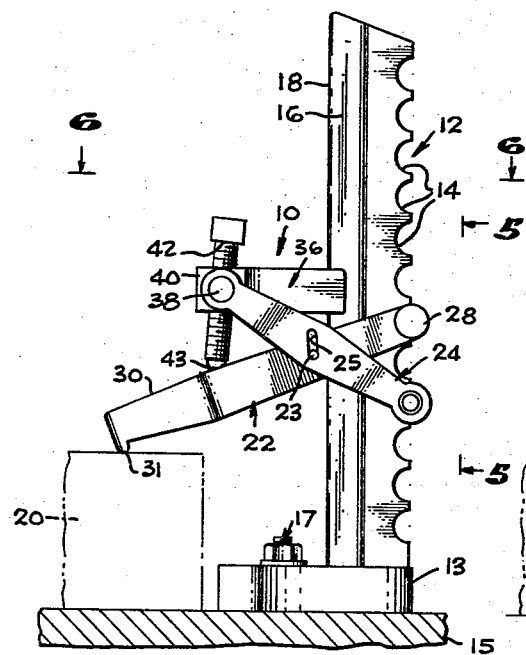
Figure 3:
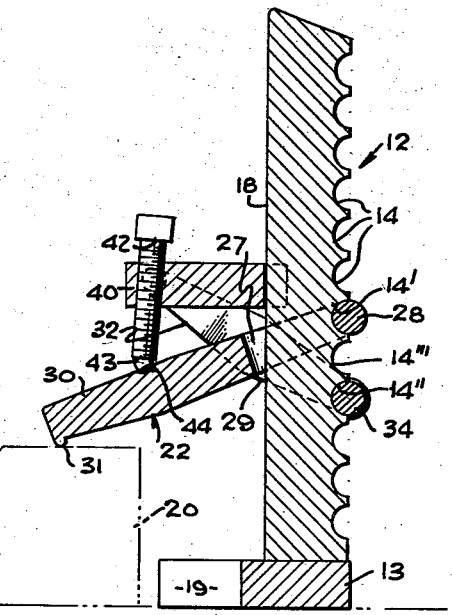
Figure 4:
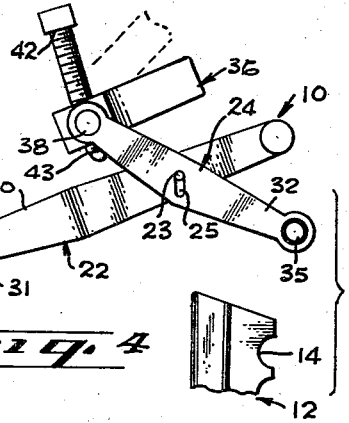
Figure 5:
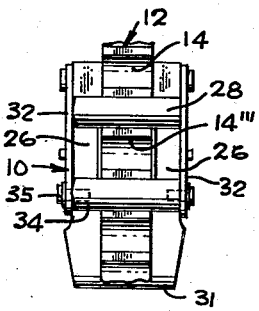
Figure 6:
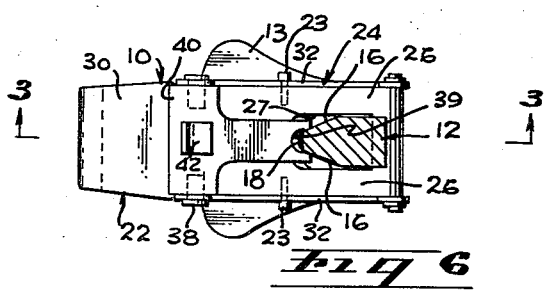

The invention will be clearly understood by reference to the accompanying drawing illustrating a preferred embodiment, and wherein;

FIG. 1 is a perspective view of the invention device;
FIG. 2 is a side elevation of the device of FIG. 1;
FIG. 3 is a vertical section through the device taken on line 3—3 of FIG. 6;
FIG. 4 shows the articulating mechanism free of the supporting ratchet member;
FIG. 5 is a partial rear view taken on line 5—5 of FIG. 2; and
FIG. 6 is a plan view taken partly in section, on line 6—6 of FIG. 2.

Referring to FIGS. 1 to 6 of the drawing, the device shown therein comprises an articulating mechanism 10 which is adapted to fit over and to be movable vertically along a support member 12 in the form of a linear ratchet integrally connected to a base 13. Along the rear edge of the ratchet 12 is formed a series of vertically spaced semicircular grooves 14. The ratchet 12 is bevelled on both sides as indicated at 16 to form a rounded forward edge 18 along the ratchet member. The base 13 of the ratchet member which supports the articulating mechanism 10, can be positioned on a work support 15 of, for example a milling machine, and the base 13 is clamped to the bench 15 by means of a bolt-and-nut fastener 17 which passes through a groove 19 formed in base 13, as best seen in FIG. 1. A work piece illustrated at 20 is positioned on the support 15, to be clamped into position by the clamping device of the invention.

The articulating lever mechanism 10, as illustrated in FIG. 4 of the drawing, can be lifted free from the ratchet support member 12 and is adapted to be inserted over and down onto the ratchet member, as illustrated in FIGS. 2 and 3. Such articulating mechanism comprises a first lever member 22 and a second lever member 24 pivotally connected intermediate their ends. Lever member 22, viewed in plan, is substantially U-shaped as best illustrated in FIG. 1, and comprises a pair of arms 26 forming a slot 27 in member 22, said arms 26 being integrally connected at their outer ends by a transverse cylindrical pin 28 which is adapted to fit into and mate with the semicircular grooves 14 of the ratchet member. It will be seen that the slot 27 is sufficiently large to receive the shank of the supporting ratchet member 12, the slot 27 between arms 26 being just wide enough to permit slidable movement of the lever member 22 vertically along the ratchet member, but not sufficiently wide to permit any substantial amount of rotational play of member 22 on the ratchet member. It will be seen that the lever member 22 is inclined downwardly in the direction of the forward end thereof, the angle of inclination of lever member 22 being limited by contact of the lower edge 29 at the inner end of slot 27, with the front edge 18 of the ratchet member, as indicated in FIG. 3. The forward end of lever member 22 has integrally connected thereto a clamp member 30 which carries at its forward end a depending lip 31 adapted to engage a work piece such as 20, and to maintain it in fixed clamped position when the device is properly manipulated, as will be described more fully hereinafter.

The second lever member 24 comprises a pair of parallel arms 32 which are connected at their rear ends by a transverse cylindrical pin 34 fixed to arms 32 by means of fasteners 35. The forward ends of arms 32 carry a T-shaped abutment member 36 (see FIG. 1) which is pivotally mounted between the arms 32 by means of pins 38. It will be seen that the lever member 24 is inclined upwardly in a direction toward the forward end of such lever member and that lever member 24 is shorter than the overall length of lever member 22.

The distance between arms 32 of lever member 24 is sufficiently great to receive therebetween the lever member 22 for pivotal motion of such lever members with respect to each other. Lever member 22 carries a pair of aligned pivot pins 23 which are received within a pair of aligned slots 25 in the arms 32 of lever member 24, for slidable movement of pins 23 in slots 25. It will be seen that this pin and slot connection between lever members 22 and 24 permits a limited degree of vertical displacement of lever members 22 and 24 with respect to each other. Also it will be noted that the slots 24, as best seen in FIG. 2 are slightly inclined from the vertical, thus also permitting a small amount of lateral displacement of lever members 22 and 24 with respect to each other.

The T-shaped abutment member 36 which is pivotally mounted at the forward ends of arms 32 of the lever member 24, has a rounded groove 39 formed at its inner end to mate with the rounded forward edge 18 and the adjacent forward portion of the bevel 16 of the ratchet member 12, as best seen in FIG. 1. The head 40 of the T-shaped abutment member 36 carries a downwardly extending adjustable screw 42, the depending lower end 43 of which can be vertically adjusted with respect to lever member 22 by manipulation of the screw. The lower end 43 of screw 40 is adapted to be received within a mating groove 44 formed in the upper surface of the lever member 22, as best seen in FIG. 3, thus providing a more positive clamping engagement of the clamp 30 and lip 31 thereof with the work piece 20, when in the operative clamping position, as seen in FIGS. 1 to 3.

When it is desired to set the clamp against a work piece to maintain it in fixed position, as seen in FIGS. 2 and 3, the articulating mechanism 10 is moved downwardly along the ratchet member 12 toward the work piece 20. As the lip 31 closely approaches or comes into light contact with the top of the work piece 20, the articulating mechanism 10 is manipulated so that the cylindrical pin 28 is positioned in a semicircular groove 14' along the rear edge of the ratchet member 12, in tight engagement with the wall of such groove. The lever member 24 is then manipulated with respect to the position of lever member 22 by means of the free motion connection provided by the pin and slot connections 23, 25 so as to place the cylindrical pin 34 in a groove 14" of the ratchet 12 and in close physical contact with the wall of such groove. As seen in FIGS. 2 and 3, the grooves 14' and 14" in which the pins 28 and 34 of the respective lever members 22 and 24 are positioned, are usually displaced vertically a distance such that there is one groove 14''' between the pins 28 and 34. However, it will be understood that the number of grooves of ratchet member 12 located between the pins 34 and 28 when the latter are seated in their respective grooves can vary, depending upon the length and angularity of the lever members 22 and 24 with respect to each other.

When the articulating mechanism is in the above described position with the pins 28 and 34 seated in their respective grooves along the rear of the ratchet, as seen in FIGS. 2 and 3 and with the clamp member 30 positioned such that the depending lip 31 is either closely adjacent or in light physical contact with the work piece 20, the screw 42 carried by the abutment member 36 is turned down to cause the end 43 thereof to enter the groove 44 of the lever member 22 and force it downwardly in a counter-clockwise rotational motion, viewing FIGS. 2 and 3. However, such adjustment of the screw 42 and consequent motion of lever member 22 will not produce any substantial downward force of the lip 31 against the work piece 20 until such adjustment and motion, as the result of the geometry of the articulating mechanism, causes the abutment member 36 to move sufficiently to the right, viewing FIGS. 2 and 3, to place the groove 39 at the forward end of the abutment member in physical contact with the forward edge 18 of the ratchet member 12. When this occurs, there are three points of contact between the articulating mechanism and the supporting ratchet member, namely the contact of pins 28 and 34 with the walls of their respective grooves of ratchet member 12, and the contact of groove 39 of the abutment member with the front edge 18 of the ratchet member. Under these conditions, as the screw 42 is further turned tightly down against the lever member 22, forcing the lip 31 thereof into tight engagement with the work piece 20, viewing FIGS. 2 and 3, the lateral horizontal components of force to the left exerted by the lever members 22 and 24 as a result of the force applied by the screw 42, are balanced by the opposite horizontal lateral component of force exerted by the abutment member 36 against the forward edge 18 of the ratchet 12. The above three points of tight contact of the articulating mechanism 10 with the supporting ratchet member 12 while the lip 31 of the clamp is in engagement with work piece 20, maintains the work piece 20 clamped in locked position during a machining operation on the work piece.

When it is desired to remove the clamp this is easily accomplished by backing the screw 42 off the clamp member 22, rotating abutment member 36 in a counter-clockwise direction viewing FIG. 2, out of contact with the ratchet member, then backing pins 34 and 28 out of their respective grooves in the ratchet member, and lifting the articulating mechanism 10 upwardly free of the work piece.

It will be noted that in order to provide proper seating of the pins 28 and 34 in the ratchet grooves 14, it is preferred that such grooves be at least semicircular.

From the foregoing, it is seen that the invention provides a versatile quickly operated clamp mechanism which is particularly designed to provide a positive clamping engagement of a work piece with little, if any, danger of unclamping as result of vibration or other extraneous forces to which the work piece may be subjected during the working operation.

While I have described a particular embodiment of my invention for the purpose of illustration, it should be understood that various modifications and adaptations thereof may be made within the spirit of the invention, as set forth in the appended claims.

I claim:

1. A clamp device which comprises a vertically extending support member having a plurality of substantially semicircular grooves along one vertically extending edge thereof and a straight vertical second edge, and an articulating mechanism supported by and movable vertically along said support member, said mechanism comprising first and second interconnected lever members, a pivotal connection between said first and second lever members intermediate the ends thereof, means permitting limited free motion between said first and second lever members, a first cylindrical pin carried at one end of said first lever member, a second cylindrical pin carried at the adjacent end of said second lever member, said cylindrical pins mating with said semicircular grooves of said support member, a clamp member carried adjacent the other end of said first lever member and adapted to engage a work piece, an arm pivotally connected to said second lever member adjacent the other end thereof, one end of said arm being adapted to contact said straight vertical edge of said support member, and a depending screw carried on said arm and adjustable to permit contact of the lower end of said screw with said first lever member, said articulating mechanism being manipulatable to position said first and second cylindrical pins in vertically spaced mating grooves along one edge of said support member and to place an end of said arm in contact with said straight vertical edge of said support member.

2. A clamp device which comprises a vertically extending support member having a plurality of substantially semicircular grooves along one vertically extending edge thereof and a straight vertical second edge, and an articulating mechanism supported by and movable vertically along said support member, said mechanism comprising first and second lever members, a pivotal connection between said first and second lever members intermediate the ends thereof, said connection comprising a pivot pin connected to one of said lever members and a slot in the other of said lever members receiving said pin, said pin and slot connection permitting limited free motion between said first and second members, a first transverse cylindrical pin carried at the rear end of said first lever member, a second transverse cylindrical pin carried at the adjacent rear end of said second lever member, said cylindrical pins mating with said semicircular grooves of said support member, a clamp member carried at the forward end of said first member and adapted to engage a work piece, an arm pivotally connected to the forward end of said second lever member, the rear free end of said arm being adapted to engage said straight vertical edge of said support member, and a depending adjustable screw carried on and passing through said arm, and adapted to engage said first lever member, said articulating mechanism being adjustable to a position wherein said first and second cylindrical pins are seated in vertically spaced grooves along one edge of said support member and the rear free end of said arm is in engagement with the straight vertical edge of said support member.

3. A clamp device which comprises a vertically extending support member having a plurality of substantially semicircular grooves along one vertically extending edge thereof and a straight vertical second edge, and an articulating mechanism supported by and movable vertically along said support member, said mechanism comprising first and second lever members, a pivotal connection between said first and second lever members intermediate the ends thereof, said connection comprising a pivot pin connected to one of said lever members, the other of said lever members having an essentially vertically extending slot therein receiving said pin, said pin and slot connection permitting limited motion in an essentially vertical direction and a slight lateral motion between said first and second members, a first transverse cylindrical pin carried at the rear end of said first lever member, a second transverse cylindrical pin carried at the adjacent rear end of said second lever member, said cylindrical pins mating with said semicircular grooves of said support member, a clamp member carried at the forward end of said first lever member and adapted to engage a work piece, an arm pivotally connected to the forward end of said second lever member, the rear free end of said arm being adapted to engage said straight vertical edge of said support member, and a depending adjustable screw carried on and passing through said arm substantially normal thereto, said first lever member having a groove in the upper surface of the forward portion thereof, said groove being adapted to receive the lower end of said screw on downward adjustment of said screw into engagement with said first lever member, said articulating mechanism being adjustable to a position wherein said first and second cylindrical pins are seated in vertically spaced grooves along one edge of said support member and the rear free end of said arm is in engagement with the straight vertical edge of said support member, thus providing simultaneous three point contact between said articulating mechanism and said support member, while the lower end of said screw is received within the groove in said first lever member and engages said last mentioned member.

4. A clamp device which comprises a vertically extending support ratchet member, a base for said member, said member having a plurality of substantially semicircular grooves along one vertically extending edge thereof and a straight vertical second edge, and an articulating mechanism supported by and movable vertically along said support member, said mechanism comprising first and second interconnected lever members, said first lever member being U-shaped and having a slot therein of sufficient width to receive said ratchet member, thus forming a pair of first parallel arms on opposite sides of said slot, a first cylindrical pin transversely interconnecting said first arms at the rear end of said first lever member, a clamp member connected to said first lever member at the forward end thereof, said first lever member being inclined downwardly in the direction of the forward end thereof, said second lever member comprising a second pair of parallel arms spaced apart sufficiently to receive said ratchet member, a second cylindrical pin transversely interconnecting said second arms at the rear end of said second lever member, said first and second cylindrical pins mating with said semicircular grooves of said ratchet member, an abutment member pivotally interconnecting the forward ends of said second arms, the rear free end of said abutment member being adapted to engage said straight vertical edge of said ratchet member, a pin and slot connection between one pair of adjacent first and second arms of said lever members on one side thereof, and a like aligned pin and slot connection between the other pair of adjacent first and second arms of said lever members on the other side thereof, said pin and slot connections pivotally interconnecting said first and second lever members and permitting limited free motion between said first and second lever members, and a depending adjustable screw mounted in and passing through the head of said abutment member, and adapted to engage said first lever member on downward adjustment of said screw, said articulating mechanism being adjustable to a position wherein simultaneously said first and second cylindrical pins are seated in vertically spaced grooves along one edge of said ratchet member and the rear free end of said abutment member is in engagement with the straight vertical edge of said ratchet member, thus providing a three point contact between said articulating mechanism and said ratchet member.

5. A clamp device as defined in claim 4, including a lip depending from said clamp member and adapted to engage a work piece, and wherein the slots of said pin and slot connections extend in an essentially vertical direction and also slightly in a lateral direction, said first lever member having a groove in the upper surface of the forward portion thereof, said groove being adapted to receive the lower end of said screw on downward adjustment of said screw into engagement with said first lever member, and wherein simultaneously the lower end of said screw is received within the groove in said first lever member and engages said last mentioned member.

References Cited in the file of this patent

UNITED STATES PATENTS

| | | |
|---|---|---|
| 972,253 | Rommer | Oct. 11, 1910 |
| 1,455,709 | Burbank | May 15, 1923 |
| 2,126,767 | Gibbons | Aug. 16, 1938 |